United States Patent [19]

Lubarsky

[11] Patent Number: 4,866,773

[45] Date of Patent: Sep. 12, 1989

[54] SYSTEM FOR INTERFACING A DIGITAL ENCRYPTION DEVICE TO A TIME-DIVISION MULTIPLEXED COMMUNICATION SYSTEM

[76] Inventor: Dan Lubarsky, 3303 Golf Dr., San Jose, Calif. 95127

[21] Appl. No.: 197,062

[22] Filed: May 20, 1988

[51] Int. Cl.[4] .......... H04L 9/00

[52] U.S. Cl. .......... 380/48; 380/49

[58] Field of Search .......... 380/48, 49

[56] References Cited

U.S. PATENT DOCUMENTS

| | | | |
|---|---|---|---|
| 4,689,606 | 8/1987 | Sato | 380/49 |
| 4,790,013 | 12/1988 | Kage | 380/48 |
| 4,792,949 | 12/1988 | Virdee et al. | 380/49 |
| 4,803,726 | 2/1989 | Levine et al. | 380/48 |

*Primary Examiner*—Salvatore Cangialosi

*Attorney, Agent, or Firm*—Townsend and Townsend

[57] ABSTRACT

A method and apparatus for interfacing a time division multiplexing (TDM) system to a data encryption device. A TDM data stream is processed prior to encryption to form a modified data stream having the TDM framing bits removed and the values of selected data bits forced to the value in a predetermined pattern. The data stream from the encryption device is treated as a source of data and transmitted as a second TDM data stream. The framing bits of the second TDM data stream are removed to recover the modified data stream which is then decrypted. The decrypted data stream is then processed to detect the predetermined pattern to reinsert TDM framing in their original locations in the data stream to form a modified TDM data stream essentially identical to the original TDM data stream.

3 Claims, 5 Drawing Sheets

SYSTEM FOR INTERFACING A DIGITAL ENCRYPTION DEVICE TO A TIME-DIVISION MULTIPLEXED COMMUNICATION SYSTEM

BACKGROUND OF THE INVENTION

1. Field of the Invention

The present invention relates generally to digital communication systems and, more particularly, relates the transmission of encrypted data over a time division multiplexing system.

2. Description of the Relevant Art

The increasing prevalence of digital communications systems has led to the widespread use of digital encryption systems by governments and other entities concerned with the security of sensitive data.

Generally, an encryption system includes an encryption device that scrambles the bit locations in a data stream to render the data stream unintelligible. A corresponding decryption device unscrambles the encrypted data stream to return the bit locations to their original locations.

Unfortunately, this encryption technique prevents the use of the increasingly popular and costeffective time division multiplexing (TDM) systems such as T1. In the T1 system 8-bit words from 24 channels sampled at 8 KHz are included as the first 192 bits in a frame. The 193rd bit in each frame is a T1 framing bits so that the frames must be transmitted at 1.544 MHz. These framing bits are utilized at a T1 receiver to define the T1 frames and route the correct 8-bit words to the corresponding channel.

If T1 formatted data were scrambled by an encryption device, then the T1 framing bits would be randomly scattered throughout the scrambled bit stream. Thus, the scrambled data is no longer in the correct T1 format and cannot be transmitted over a T1 system. Accordingly, the transmission of encrypted data has required the use of special dedicated lines thereby decreasing the flexibility and increasing the cost of transmission relative to the cost of using T1.

It is thus apparent that a system for facilitating the use of a standard TDM system for transmitting encrypted data would be of great benefit to the art.

SUMMARY OF THE INVENTION

The present invention is a system that facilitates the use of data encryption device in a TDM telecommunication system. Generally, a first TDM data stream is provided to a transmit side of the system for encryption and transmission as a second TDM data stream. A receive side receives the second TDM data stream and reforms it into a modified first TDM data stream essentially identical to the first TDM data stream provided to the transmit side.

According to one aspect of the invention, the TDM framing bits are removed so that the last bit location of each frame and the first bit location of the succeeding claim form an adjacent bit location pair. A particular bit location in each frame is selected as a newsynch bit location and the values of the data bits in these locations are forced to values defining a newsynch pattern. These operations form a first reformatted data stream.

The first reformatted data stream may then be encrypted to form a second reformatted data stream. Subsequently. TDM framing bits are randomly inserted into the second reformatted data stream to form a third reformatted data stream is suitable form for transmission over the TDM network.

According to a further aspect of the invention, the first reformatted data stream is processed at the receive side to recover the data present in the first TDM data stream. The newsynch pattern is detected and the location of the adjacent bit location pairs in the first reformatted data stream is identified. Subsequently, TDM framing bits are inserted between the bit locations in the adjacent pair to form a modified first TDM bit stream. The data in each TDM frame in the modified first TDM data stream differs from the data in each TDM frame of the first TDM frame by at most one bit, i.e., the value of the bit in the newsynch bit location may have been changed during the forcing operation.

According to a further aspect of the invention, the selection of the position of the newsynch bit locations is programmably controlled. Thus, in a particular environment, the newsynch bit location may be placed in the channel least affected by a slightly increased data error rate. Accordingly, the effect of forcing the data bit in the newsynch data position is minimized.

According to a further aspect of the invention, the first TDM data stream is transmitted at a TDM clock rate. In the transmit side, the first modified data stream is transmitted at a modified clock rate, derived from the TDM clock rate, that is slower that the TDM clock rate to compensate for the removal of the TDM framing bits. In the receive side, the first reformatted TDM data stream is received at a TDM clock rate, derived from the modified clock rate, to compensate for the insertion of TDM framing bits.

According to a further aspect of the invention, a modified first reformatted data stream may be generated at the transmit side by removing the TDM framing bit and a data bit. The modified clock rate is adjusted accordingly. Prior to transmission, a pulse may be inserted to maintain the minimum pulse density required by some TDM systems.

Other advantages and features of the invention will be apparent in view of the drawings and following detailed description.

DETAILED DESCRIPTION OF THE PREFERRED EMBODIMENTS

Figure 1A:
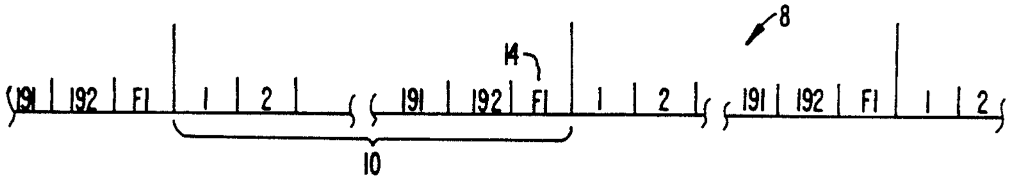
FIGS. 1A through 1E are schematic diagrams of the formats of the various data streams created by the preferred embodiment.

FIGS. 1A through 1G depict the data formats resulting from the various steps of the invention. Referring first to FIG. 1A, a first T1 digital data stream 8 in standard T1 format is depicted. Each frame 10 includes 24 8-bit channel words comprising 192 bits and a T1 framing bit (F1) 14 for a total of 193 bits and is transmitted at a T1 clock rate 1.544 MHz. The values of the T1 framing bits are selected so that successive bit form a pattern recognized at the T1 receiver to provide framing information. Modules for formatting, transmitting, receiving T1 data are well-known and not part of the present invention. These modules are described, for example, in the book "T-1 Primer," Rockwell International, 1984.

Figure 1B:
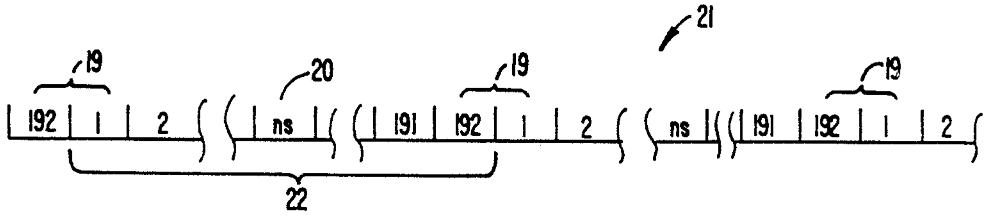

Turning next to FIG. 1B. the T1 framing bit 14 is removed from each frame 10 and, as a result, the 192nd data bit location in each frame and the first data bit location in the following frame form an adjacent pair 19 of bit locations. The data bit in a newsynch data bit location 20 in each T1 frame 10 is forced to a newsynch bit value to form a first reformatted data stream 21 as depicted in FIG. 1B. The position of the newsynch bit location 20 is fixed relative to the positions of the adjacent pairs 19.

In FIG. 1B, the newsynch bit location 20 is depicted at bit location N. The result of newsynch forcing step is to convert the original 193 bit T1 frame 10 into a modified 192 bit T1 frame 22 having a newsynch bit 20 replacing one of the data bits and bounded by the adjacent pairs 19. The values of the inserted newsynch bits 14 are selected to form a predetermined newsynch pattern. In order to match the first digital data stream 8 to the first reformatted data stream 18, the reformatted data stream 8 is transmitted at a modified clock rate of 1.536 MHz. which is equal to the T1 clock rate multiplied the ratio of 192 (the number of bits in the modified T1 frame 22) to 193 (the number of bits in the T1 frame 10).

Figure 1C:
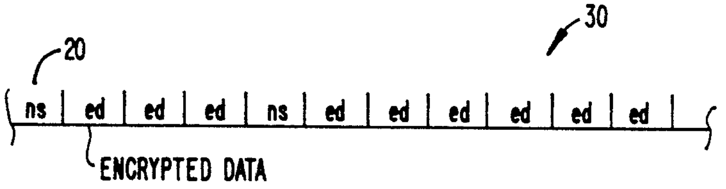

The first reformatted data stream 18 is then passed through an encryption device and scrambled to form a second reformatted data stream 30 depicted in FIG. 1C. Note that the newsynch bits 20 assume psuedorandom positions in the data stream 30 and all newsynch pattern information has been destroyed. The second reformatted data stream 30 is transmitted at the modified clock rate of 1.536 MHz.

Figure 1D:
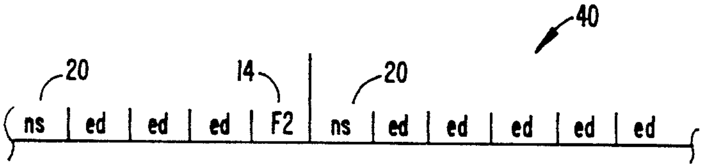

Next, T1 framing bits are randomly inserted into the second reformatted data stream 30 to form a second T1 data stream 40 depicted in FIG. 1D. The data in the frames defined by these randomly inserted T1 framing bits does not correspond to the data in the frames of the first T1 digital data stream 8 and, thus the original data could not be recovered from the second reformatted data stream 40. This insertion is performed utilizing standard technology. The second T1 data stream is transmitted at the T1 clock rate of 1.544 MHz. because each frame now includes 193 bits, i.e., 192 data bits of scrambled data and newsynch bits and one inserted T1 framing bits.

When the second T1 data stream 40 is received, the T1 framing bits are removed utilizing standard technology to reform the second reformatted data stream 30 of FIG. 1C. As before, the new synch bits are scattered throughout the data stream 30 in a psuedo-random manner.

Next the data is decrypted to reform the first reformatted data stream 21 of FIG. 1B. The newsynch bits are now returned to their original locations relative to the channel words 12 and the newsynch pattern has been reformed. This newsynch pattern is detected and utilized to identify the locations of the adjacent pairs 19 which form the boundary between the modified T1 frames 22.

Figure 1E:
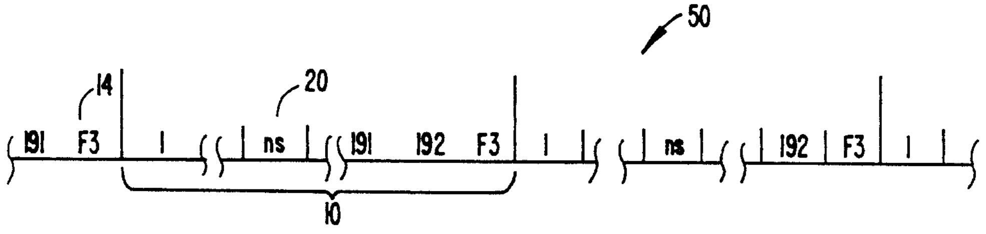

Next, T1 framing bits are inserted between bit locations of the adjacent pairs to redefine the modified T1 frames 22 and to form a modified first T1 data stream 50 depicted in FIG. 1E. The modified first T1 data stream 50 differs from the first T1 data stream 8 differ in two respects. First, the newsynch bit 20 has replaced the data bit in the Nth bit position and second the values of the particular T1 framing bits may vary, although the pattern is the same.

The particular newsynch bit position 20 in which the the data bit is forced to the newsynch bit value is programmably selected. Generally, a channel transmitting data, such as voice data, for which a moderate error rate is tolerable should be selected. Thus. the insertion of the newsynch bit 20 does not significantly degrade the quality of the data. This programmable insertion feature allows the method to be utilized in most practical systems. The data can usually be formatted so that at least one channel can tolerate a slight increase in error rate.

Figure 2:
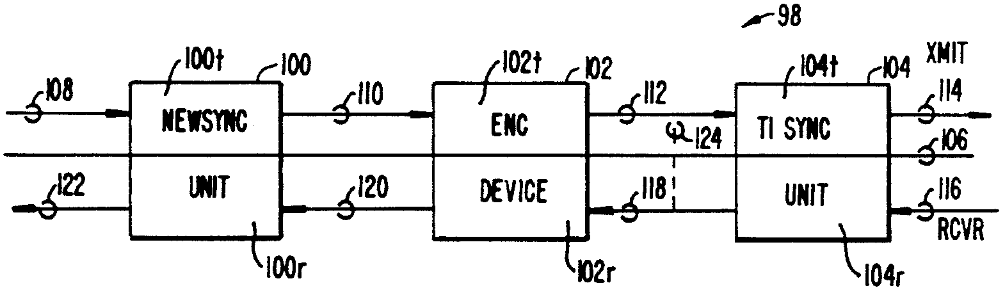
FIG. 2 is a high-level block diagram of the invention.

FIG. 2 is a block diagram of a system for performing the above-described procedures. Referring now to FIG. 2, a T1 data encryption interface 98 includes a newsynch unit 100, a data encryption unit 102, and a T1 synch unit 104. The data encryption unit is not part of the invention and the details of its structure and operation are not critical to the invention. The interface unit 98 is divided into a transmit and receive side **98*t* and 98*r* by the horizontal line 106**

Turning first to the transmit side **98*t*, the newsynch unit 100*r* has in input port coupled to a first bus 108 for receiving the first T1 data stream 8 and an the first reformatted data stream 21. The encryption device 102*t* has an input port coupled to the second bus 110 and an output port coupled to a third bus 112 for transmitting the second reformatted data stream 30. The T1 synch unit 104*t* has an input port coupled to the third bus 112 and an output port coupled to a fourth bus 114 for transmitting the second T1 data stream 40**.

Turning next to the receive side **98*r*, the T1 synch unit 104*r* has an input port coupled to a fifth bus 116 for receiving the second T1 data stream 40 and an output port coupled to a sixth bus 118 for transmitting the reformed second reformatted data stream 30. The encryption device 102*r* includes an input port coupled to the sixth bus 118 and an output port coupled to a seventh bus 120 for transmitting the reformed first modified data stream 21. The newsynch unit 100*r* has an input port coupled to the seventh bus 120 and an output port coupled to an eighth bus 122 for transmitting the modified first T1 data stream 50**.

The operation of the system depicted in FIG. 2 will now be described. The invention can be understood by considering a loop with the third and fourth buses 112 and 118 connected (shown by dotted line 124) because both buses transmit the second reformatted data stream. The function of the transmit side **100*t* of the newsynch unit is to modify the first T1 data stream 8 by removing the T1 framing bits 14 and forcing the values of the data bits in the newsynch bit locations 20 to the newsynch bit values to form the first reformatted data stream 21. The first reformatted data stream is then scrambled by the transmit side 102*t* of the encryption device 102 and unscrambled by the receive side 102*r* of the encryption device 102. Thus, the first reformatted data stream is reformed and transmitted to the input port of the receive side 100*r* of the newsynch unit 100. The newsynch pattern is detected to locate the the adjacent bit location pairs 19 that form the boundary between modified T1 frames 22 and the T1 framing bits are inserted between the modified T1 frames 22. Accordingly, the modified first T1 data stream is formed and transmitted on the eighth bus 122**.

Figure 3:
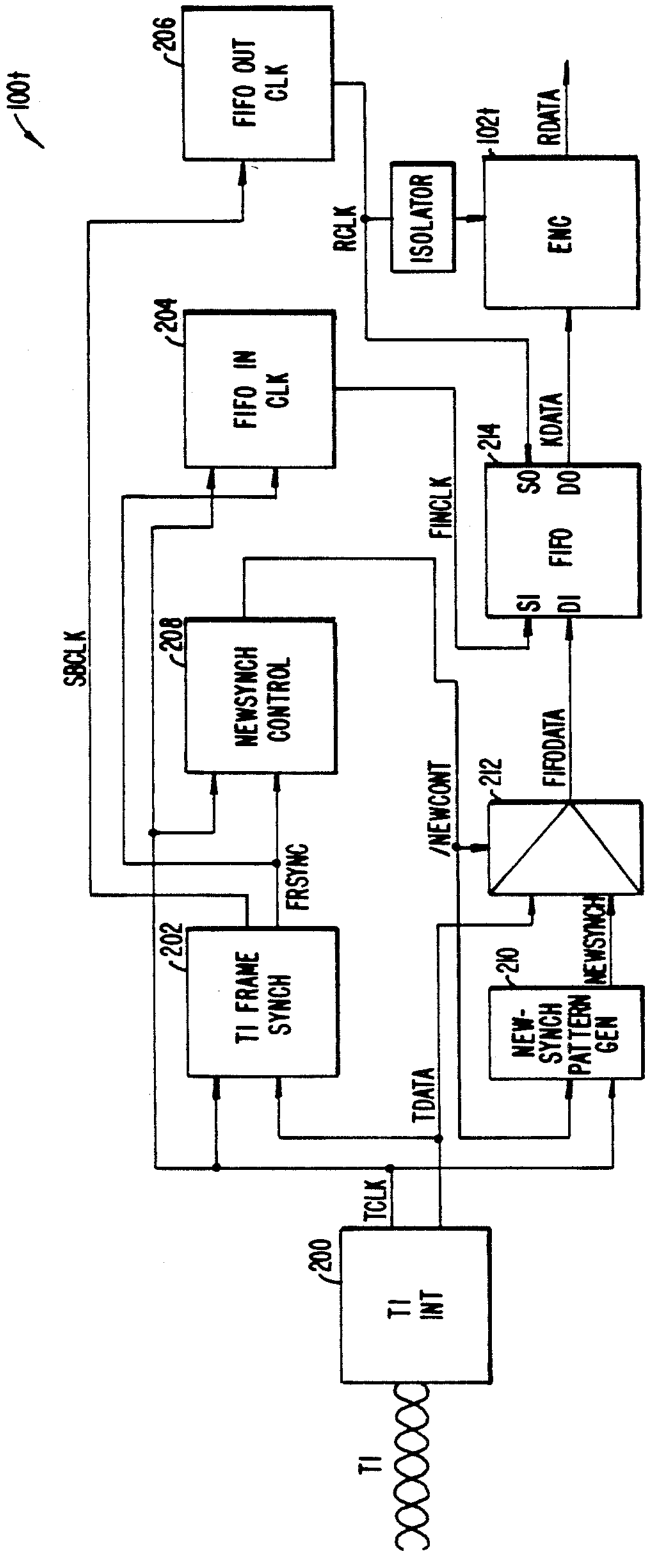
FIG. 3 is a detailed block diagram of the transmit side of the NEWSYNCH UNIT.

FIG. 3 is a detailed block diagram of the transmit side **100*t* of the newsynch unit 100. In FIG. 3, a T1 interface generates the first T1 data stream (TDATA) and the 1.544 MHz. T1 clock signal (TCLK). The TDATA and TCLK signals are received at the input port of T1 frame synch unit (TFSU) 202. The TFSU 202** generates a 4 KHz SBCLK signal and a FRSYNCH signal at its output ports indicating the occurrence of T1 framing bits in TDATA.

A FIFO IN CLK generator 204 receives the TCLK and FRSYNCH signals at its input ports and generates a FINCLK signal at its output port. A FIFO OUT CLK generator 206 receives the SBCLK signal at its input port and generates the modified 1.536 clock signal (RCLK).

A newsynch control unit 206 receives the TCLK and FRSYNCH signals at its input port and generates a /NEWCONT signal at its output port. This /NEWCONT signal and the TCLK signal are received at the input port of a newsynch pattern generator which generates the newsynch bits 20 (NEWSYNCH). A 2:1 mux 212 receives the TDATA and NEWSYNCH signals at its input ports, the /NEWCONT signal at its control ports, and transfers the selected input signal to its output port in the form of a FIFODATA signal.

A FIFO 214 receives the FINCLK signal at its input clock port, the FIFODATA signal at its input data port, the RCLK signal at its output clock port, and generates a KDATA signal at its output data port. The transmit side of the encryption device **102*t*** receives the KDATA signal at its input port, the RCLK signal at its clock port, and generates the second reformatted data stream (RDATA) at its output port.

Figure 4:
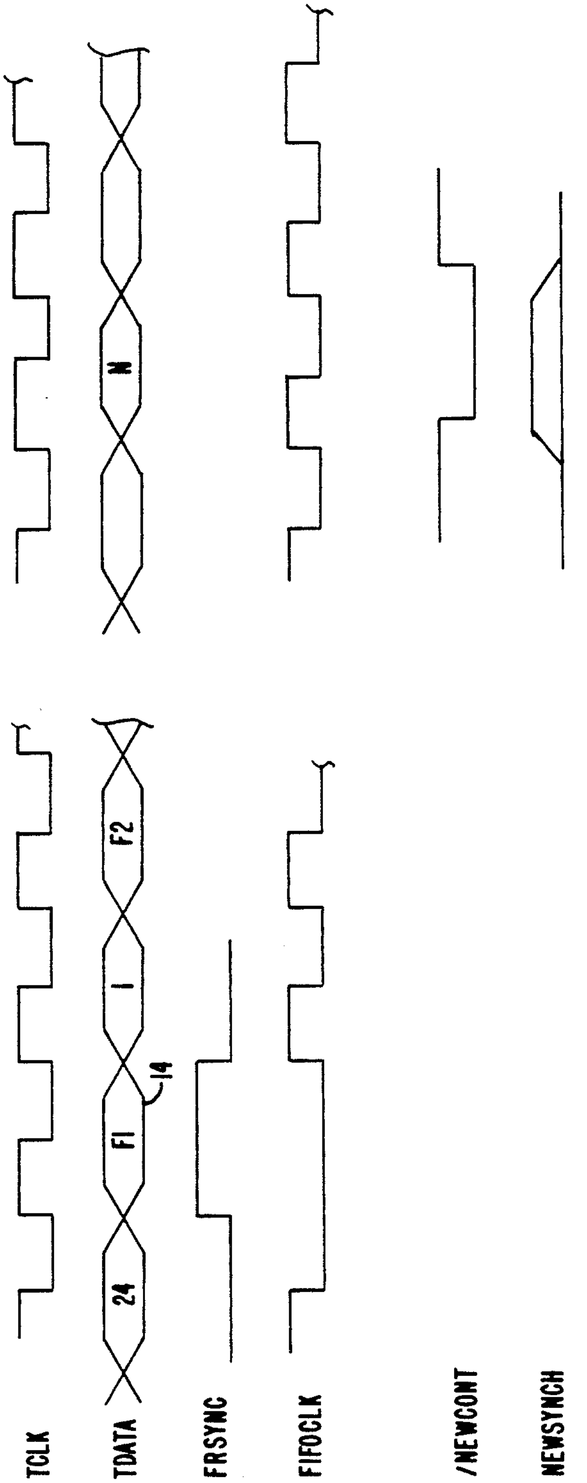
FIG. 4 is a timing diagram illustrating the operation of the system of FIG. 3.

The operation of the system depicted in FIG. 3 will now be described with reference to the timing diagram of FIG. 4. In FIG. 4. TDATA and TCLK are shown in synchronism at a 1.544 MHz rate. The FRSYNCH signal is generated every 193rd T1 clock cycle in sequence with the occurrence of a T1 framing bit 14. The FIFO IN CLOCK generator 204 normally transmits TDATA as the FINCLK signal. However, when the FRSYNCH signal is asserted, the FINCLK signal remains low.

The FIFO 214 latches the data at its input data port on the falling edge of FINCLK signal. Accordingly, since FINCLK is held low when the T1 framing bit 14 is presented at the FIFO input port, the T1 framing bit 14 is blocked from entering the FIFO 214, and the T1 framing bits are removed from the first T1 data stream 8. Since one bit is removed each frame, the data from the FIFO 214 is clocked out at the RCLK rate of 1.536 MHz. The phase of the RCLK signal is derived from the TCLK signal through the use of the SBCLK signal.

The mux 212 normally transmits the TDATA signal to the input port of the FIFO 214. However, when /NEWCONT is asserted (made low) the newsynch bit 14 is transmitted to the input port of the FIFO 214. As depicted in FIG. 4, the newsynch bit 14 replaces the Nth bit in the T1 frame.

In practice the position of the Nth frame is controlled by utilizing a set of DIP switches to set the value of an 8-bit binary number. This binary number is received at the first input port of a comparator. A second 8-bit number is generated by counting TCLK pulses starting from the falling edge of the FRSYNCH signal. This count is received at the second input port of the comparator. When the count is equal to the binary number /NEWCONT is asserted. Thus, any bit position can be selected by varying the value of the set number.

The pattern of the newsynch bits 14 is a binary Barker code which has the properties of emulating a psuedorandom signal.

Figure 5:
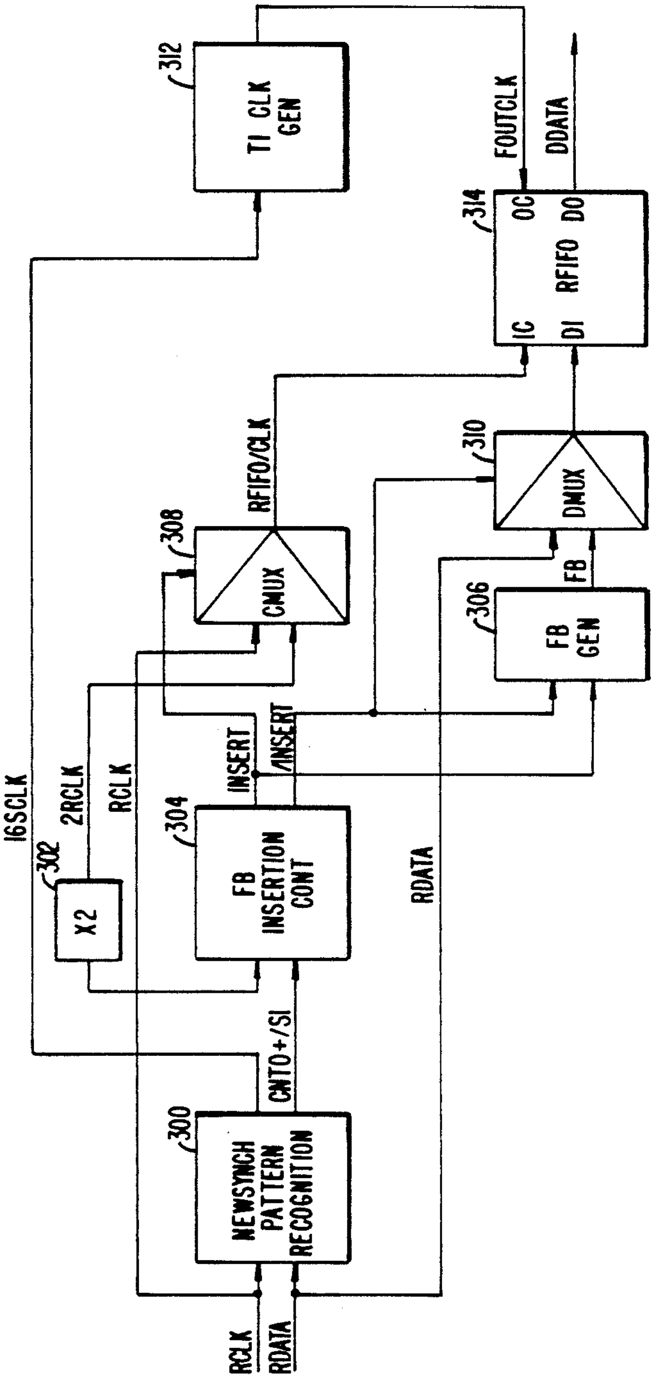
FIG. 5 is a detailed block diagram of the receive side of the NEWSYNCH UNIT.

FIG. 5 is a detailed block diagram of the receive side **100*r* of the newsynch unit 100. In FIG. 5, the RCLK and RDATA signals are received at the input ports of a NEWSYNCH PATTERN RECOGNITION UNIT (NPRU) 300 which generates the signals 16SCLK and CNTO+/S1 at its output ports. The RCLK signal is coupled to the input port of a doubler 302 which generates the signal 2RCLK at its output port. An FB INS CONTROLLER 304 receives the RDATA and CONO+/S1 signals and generates the control signals INSERT and /INSERT which are received at the input ports of an FB GEN 306. The FB GEN 306 generates an FB signal at its output port. A 2:1 CMUX 308** receives the RCLK and 2RCLK signals at its input ports, the INSERT signal at its control port, and selectively transfers one of its input signals to its output port as the RFIFOCLK signal.

A 2:1 DMUX 310 receives the RDATA and FB signals at its input ports, the /INSERT signal at its control port, and selectively transfers one of its input signals to its output port as the RFIFODATA signal. A T1 CLK GEN 312 receives the 16SCLK signal at its input port and generates an FOUTCLK signal at its output port. An RFIFO 314 receives the RFIFOCLK signal at its input clock port, the RFIFODATA signal at its input data port, the FOUTCLK signal at its output clock port, and generates a DDATA signal at its output port.

The operation of the system of FIG. 5 will now be described with reference to the timing diagram of FIG. 6. The RDATA signal is in the form of the first reformatted data stream 21 and RCLK is the 1.536 MHz clock. The NPRU 300 searches for the newsynch pattern and generates the CNTO+/S1 signal to indicate its detection. The FB INS CONTROLLER 304 is programmed with the bit number N specifying the location of the newsynch bit 20 in the modified T1 frame 22. The FB INS CONTROLLER receives the CNTO+/S1 signal and utilizes the programmed information to assert the INSERT signal to identify the boundaries between modified T1 frames 22.

Figure 6:
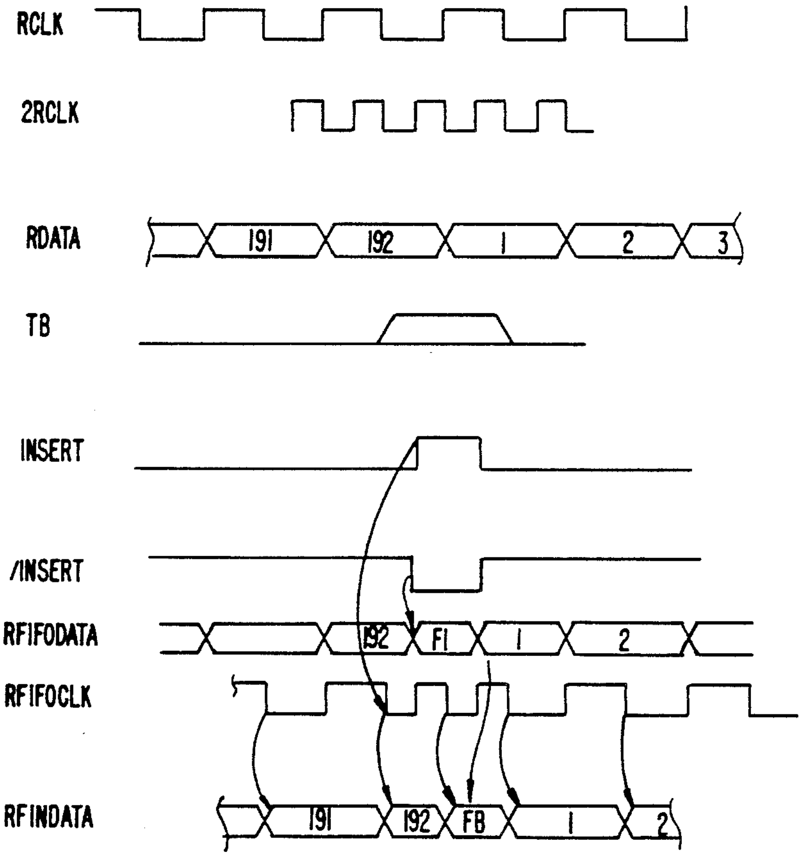
FIG. 6 is a timing diagram illustrating the operation of the system of FIG. 5.

Referring to FIG. 6, the 2RCLK signal is twice the frequency of the RCLK signal with phases of the two signals shown in the figure. When INSERT is not asserted RFIFOCLK is equal to RCLK. However, when INSERT is asserted RFIFOCLK is equal to 2RCLK to insert an extra pulse into RFIFOCLK as shown in the figure. Concurrently, when /INSERT is not asserted RFIFODATA is equal to RDATA. However, when /INSERT is asserted the last part of bit 192 and the first part of bit 1 is replaced by the T1 framing bit FB.

RFIFODATA is clocked into the RFIFO 314 on the falling edge of RFIFOCLK. Accordingly, the T1 framing bit. FB. is inserted between each modified T1 frame 22 as shown by RFINDATA. Because one extra bit is added every frame, the DDATA signal is clocked out by FOUTCLK at 1.544. DDATA is in the form of the modified T1 data stream 50. The phase of the FOUTCLK signal is derived from the RCLK signal through the use of the 16SCLK signal.

In some T1 systems a minimum pulse density in the data stream is required to maintain timing. In an alternative embodiment, in the transmit side, the FIFO IN CLK generator omits a pulse at a predetermined time to prevent the loading of a data bit in selected bit location into the FIFO 214. Thus, a data bit and the T1 framing bit are removed. Additionally, the FIFO OUT CLK generator 204 generates a 1.538 MHz. RCLK signal to compensate for the removal of two bits. The insertion of pulses to satisfy the minimum pulse density is standard and not part of the invention.

Detailed schematic diagrams for implementing the functional blocks of FIGS. 3 and 5 are appended to the specification.

The invention has now been described with reference to the preferred embodiments. Modifications and substitutions will now be apparent to persons of skill in the art. In particular, the invention is not limited to T1 but may be utilized with other TDM systems. Further, alternate hardware or software controlled embodiments may realize the same functions. Additionally, the invention could be advantageously employed in a TDM system utilizing groups of bits to implement framing. Accordingly, the invention is not intended to be limited except as provided by the appended claims.

What is claimed is:

1. A system for interfacing a time division multiplexing (TDM) digital telecommunication system, including a TDM transmitter and TDM receiver, to an encryption device that provides for scrambling digital data being transmitted and unscrambling digital data being received, where the TDM data stream is transmitted at predetermined TDM clock rate and is formatted into TDM frames that include a predetermined number of data bits in bit locations and TDM framing bits located at predetermined TDM framing bit locations, where the pattern of the framing bits is utilized at the TDM receiver to identify the frames, said system including a transmitter side comprising:

means for receiving a first TDM data stream including data and/or voice information to be encrypted;

means for removing the TDM framing bits from said first TDM data stream;

means for generating a predetermined pattern of newsynch bits;

means for selecting a newsynch data bit location in each TDM frame;

means for forcing the values of the data bit in said newsynch data bit location in each TDM frame to the value of bit in said predetermined pattern, with a first reformatted data stream resulting from the removal of said TDM framing bits and the forcing of the data bits to the values of said newsynch bits:

encryption means for scrambling the bits in said first reformatted data stream to form a second reformatted data stream;

means for inserting TDM framing bits into said second reformatted data stream to form a second TDM data stream;

with said system also including a receiver side comprising:

means for receiving said second TDM data stream;

means for removing said inserted TDM framing bits from said second TDM data stream to reform said second reformatted data stream;

decryption means for unscrambling the data in said second reformatted data stream to reform said first reformatted data stream:

means for detecting the predetermined pattern of newsynch bits in said reformed first reformatted data stream and and for generating a newsynch pattern signal that identifies framing bit insertion locations in said reformed first reformatted data stream;

means for generating TDM framing bits; and means, adapted to receive said newsynch pattern signal, for inserting said generated TDM framing bits into said framing bit insertion locations in said reformed first reformatted data stream to form a modified first TDM data stream having data identical to said first TDM data stream except for inclusion of said newsynch pattern bits.

2. A system for interfacing a time division multiplexing (TDM) digital telecommunication system, including a TDM transmitter and TDM receiver, to an encryption device that provides for scrambling digital data being transmitted and unscrambling digital data being received , where the TDM data stream is transmitted at predetermined TDM clock rate and is formatted into TDM frames that include a predetermined number of bit locations and TDM framing bits located at predetermined TDM framing bit locations in the TDM frames, where the pattern of the framing bits is utilized at the TDM receiver to generate a frame synch signal identifying the TDM frames said system comprising programmable means for selecting a newsynch bit location in each TDM frame;

means for generating a predetermined pattern of newsynch bits;

means, adapted to receive said frame synch signal, for forcing the values of data bits in said newsynch bit location in successive TDM frames to successive newsynch values in said pattern;

means, adapted to receive said frame synch signal, for removing the TDM framing bits from each modified TDM frame with a first reformatted data stream resulting from the removal of said TDM framing bits and insertion of newsynch bits; and means for transmitting said first reformatted data stream to the encryption device at a newsynch clock rate, where the ratio of the newsynch clock rate the TDM clock rate is the same as the ratio of the number of bits in said modified TDM frame to the number of bits in the TDM frame.

3. The invention of claim 2 further comprising:

means, adapted to receive said second reformatted data stream, for detecting said predetermined pattern of newsynch bits in said received data stream, and for generating a pattern detection signal when said pattern is detected;

programmable means, adapted to receive said pattern detection signal, for generating a frame separation signal to define a boundary between successive modified TDM frames in said received data stream:

means for generating TDM framing bits:

means for inserting said generated TDM framing bits into the predetermined TDM framing positions to reform said TDM data stream; and means for transmitting said reformed TDM data stream as the TDM clock rate.

* * * * *